United States Patent [19]

Sitter

[11] Patent Number: 5,584,527
[45] Date of Patent: Dec. 17, 1996

[54] LIGHTWEIGHT TRAILER WITH INTEGRAL PLATE SEAMS

[75] Inventor: Don H. Sitter, Lafayette, India.

[73] Assignee: Oshkosh Truck Corporation, Oshkosh, Wis.

[21] Appl. No.: 309,827

[22] Filed: Sep. 21, 1994

[51] Int. Cl.$^6$ .................................................. B62D 33/04
[52] U.S. Cl. .......................... 296/181; 296/191; 52/464; 52/395; 220/1.5; 105/409
[58] Field of Search ..................................... 296/181, 191, 296/29, 183; 220/1.5; 52/464, 461, 459, 395, 467, 468, 470, 471; 105/397, 401, 404, 409

[56] References Cited

U.S. PATENT DOCUMENTS

| | | | |
|---|---|---|---|
| Re. 32,647 | 4/1988 | Wilson | 296/181 |
| 1,250,136 | 12/1917 | Burnett | 105/409 |
| 1,922,027 | 8/1933 | Carter | 296/181 |
| 2,363,170 | 11/1944 | Fontaine | 296/181 |
| 2,502,703 | 4/1950 | Chaplin | 296/181 |
| 3,028,192 | 4/1962 | Jewell | 296/29 X |
| 3,216,758 | 11/1965 | Bohlen . | |
| 3,319,585 | 5/1967 | Pulcrano | 105/409 |
| 3,380,216 | 4/1968 | Spence | 296/181 X |
| 3,547,483 | 12/1970 | Ehrlich . | |
| 3,880,460 | 4/1975 | Pennock | 296/29 |
| 3,962,015 | 6/1976 | Heimann | 296/181 X |
| 4,810,027 | 3/1989 | Ehrlich . | |
| 5,058,756 | 10/1991 | Green . | |
| 5,066,066 | 11/1991 | Yurgevich et al. . | |
| 5,112,099 | 5/1992 | Yurgevich et al. . | |
| 5,209,541 | 5/1993 | Janotik | 296/29 |
| 5,403,062 | 4/1995 | Sjostedt et al. | 296/181 |

*Primary Examiner*—Joseph D. Pape
*Attorney, Agent, or Firm*—Baker & McKenzie

[57] ABSTRACT

An improved semi-trailer panel assembly which offers the strength and durability of a standard "post and sheet panel" trailer as well as the lighter weight and increased cargo area which, until now, has only been associated with a "plate-type" trailer. Multiple rectangular panels having a generally corrugated design are placed side-by-side upon the side of a semi-trailer. Seam extrusion members, each having two elongated grooves, are positioned between adjacent panels whereby the side edges of these panels are inserted into the grooves and secured in place with a flexible adhesive; no bolts or rivets are necessary for this function.. Small connection clips are also provided which snap over the side edges of the panels and ensure the proper positioning of the panel edges within the grooves for adhesion purposes. The upper and lower edges of all panels and extrusion members are then secured with bolts or rivets to the upper and lower base rails, respectively, of the trailer frame. The corrugated design of the side panels provides sufficient columnar strength for the trailer such that vertical support posts are not required. Accordingly, the interior width of the trailer may be extended, within regulatory guidelines, to at least 101 inches.

11 Claims, 4 Drawing Sheets

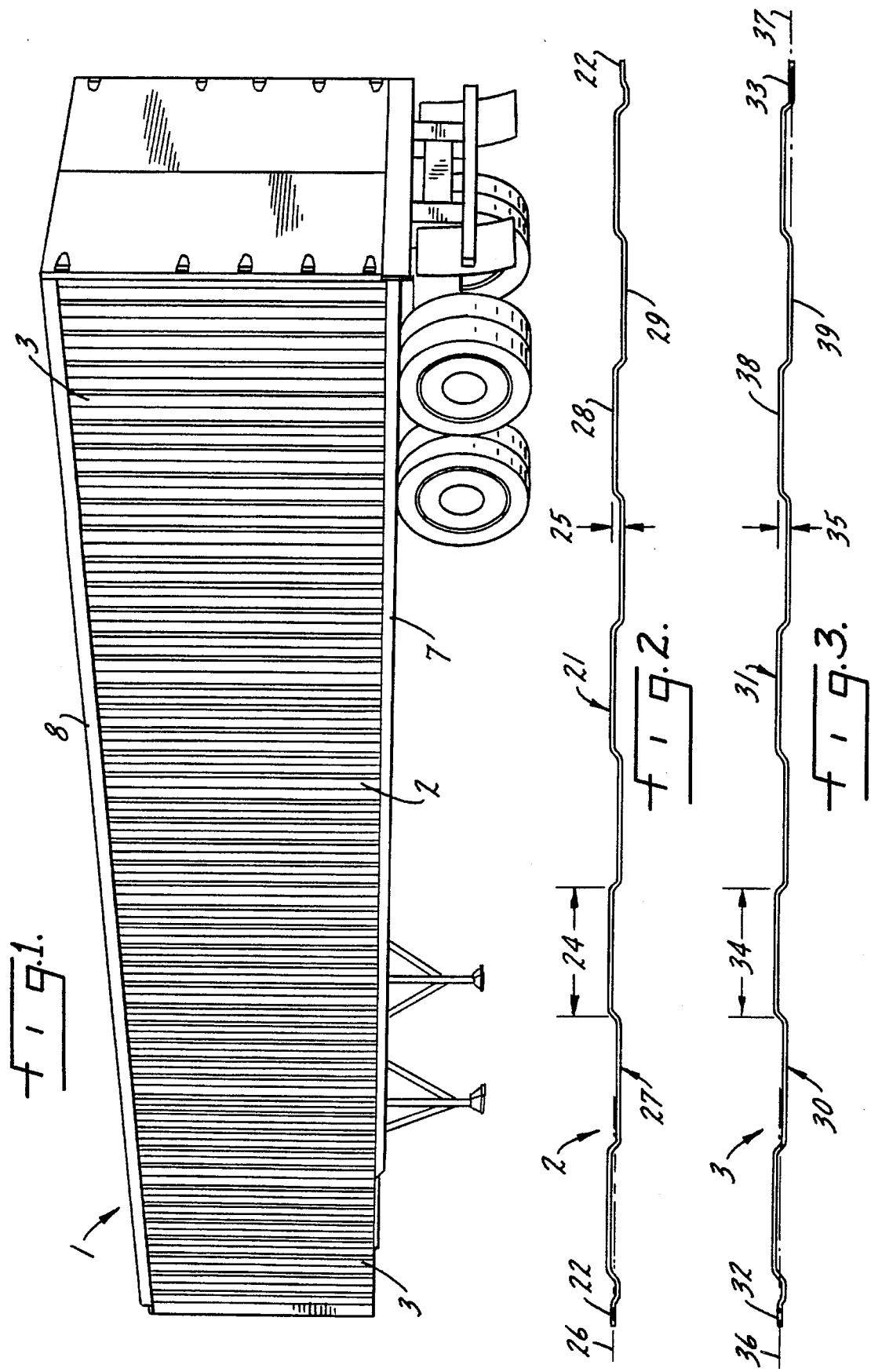

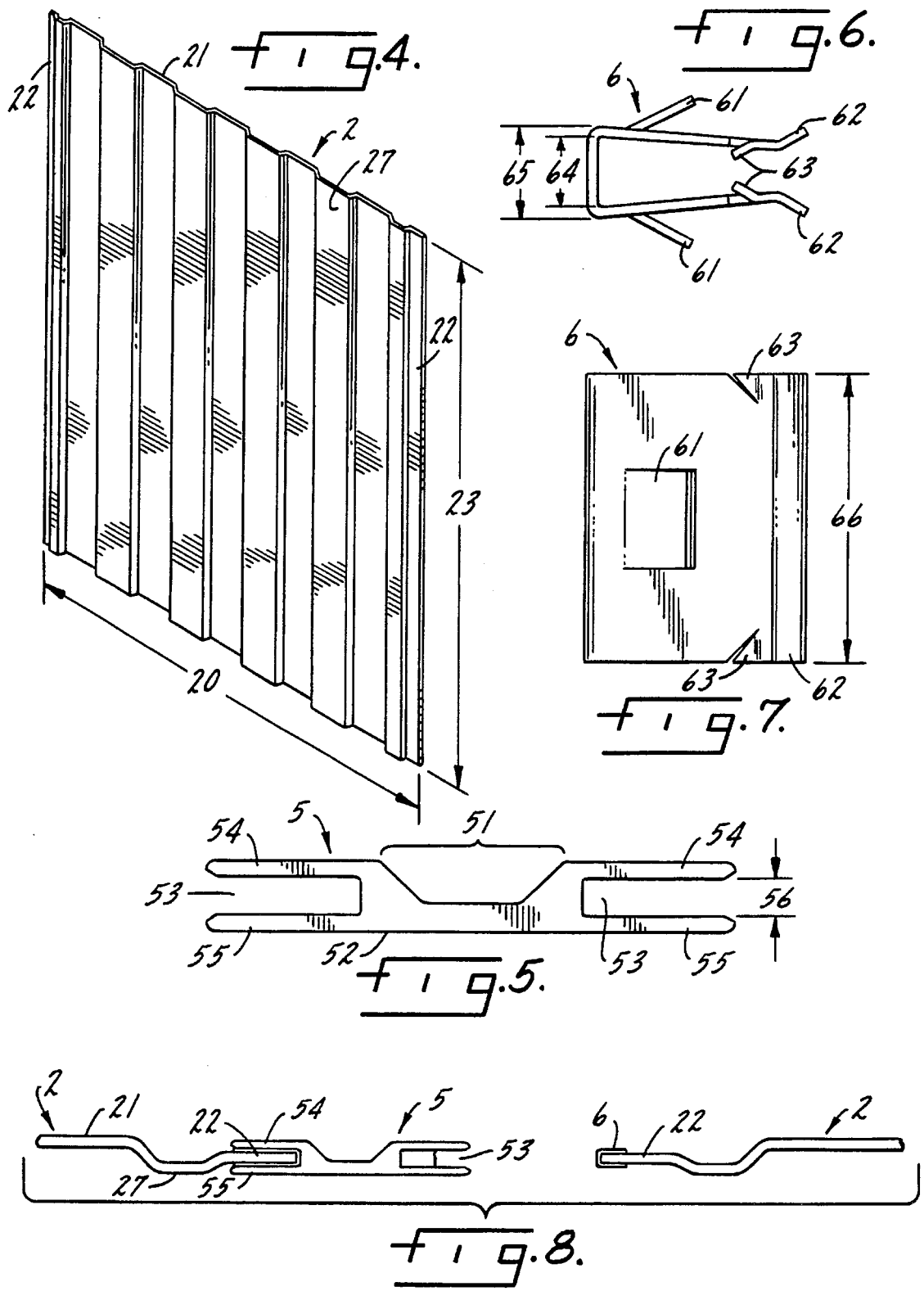

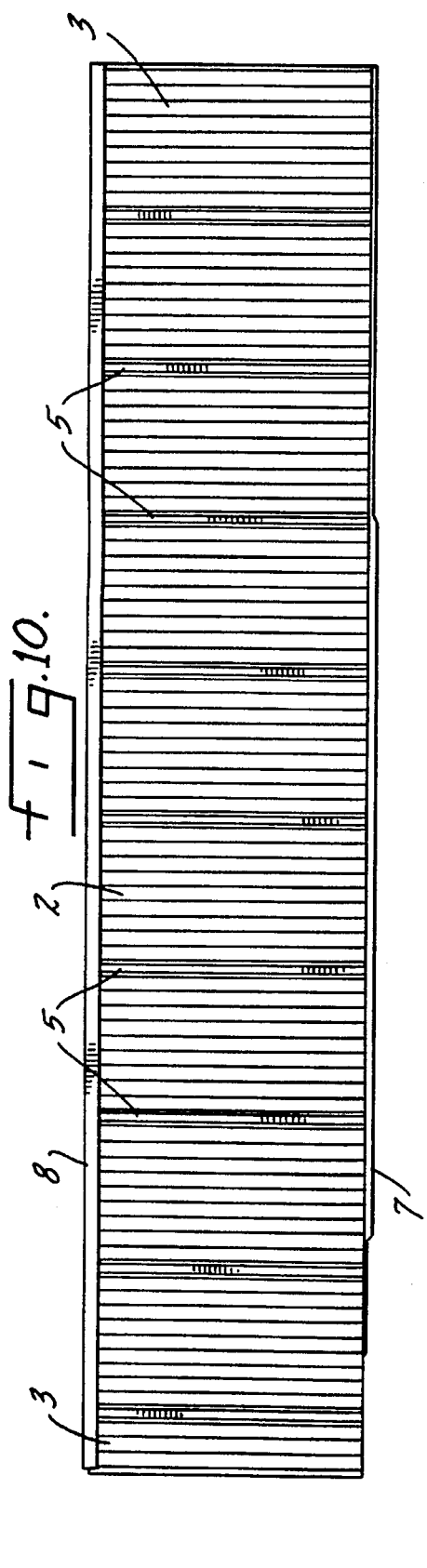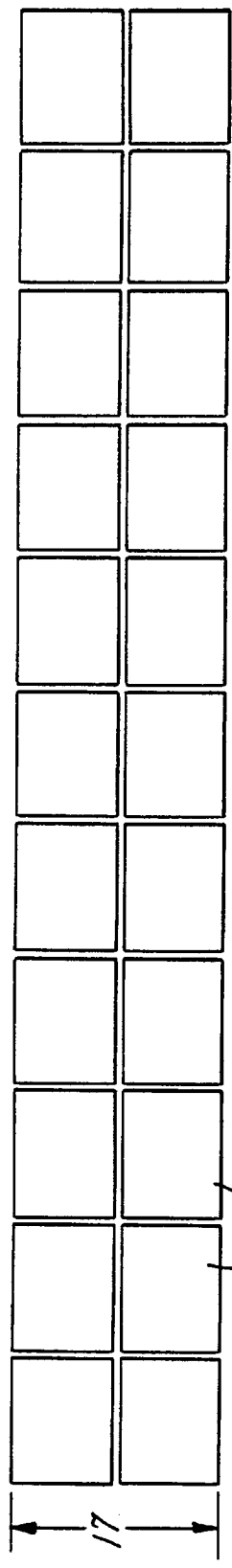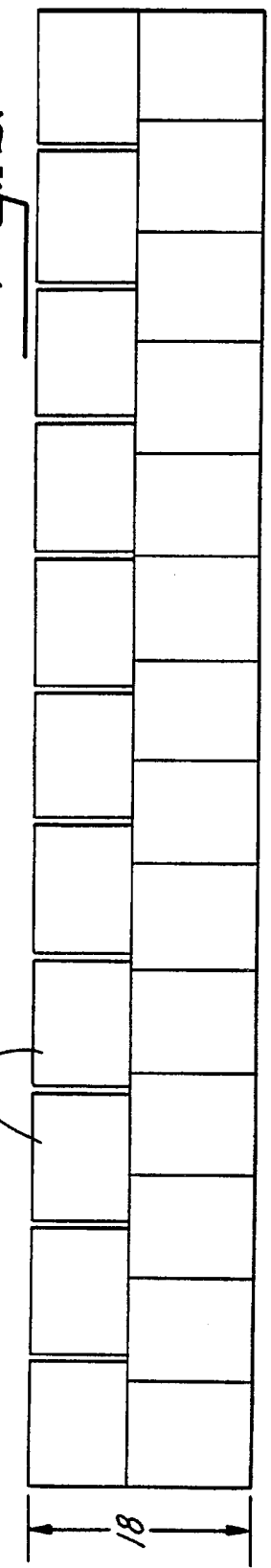

LIGHTWEIGHT TRAILER WITH INTEGRAL PLATE SEAMS

This present invention relates generally to plate-type-semi-trailers and similar cargo-carrying bodies and, more specifically, to a wall system for high cubic capacity, high-strength lightweight trailers constructed from heavy gauge corrugated metal plates which are joined using a flexible adhesive seal and special gauging clips within a seam extrusion member, thereby achieving optimization of sidewall columnar strength, leak resistance, usable interior volume, desirable vehicle weight and ease of production.

BACKGROUND OF THE INVENTION

Two principle types of semi-trailer sidewall constructions are commonly employed in this field of art. The frequently used "post and sheet panel" construction method typically involves the installation of spaced metallic vertical posts upon a semi-trailer and the subsequent attachment to these posts of sheet panels having various compositions. These vertical posts inevitably detract from the available volume within the semi-trailer either by protruding into the cargo area themselves or by affixing the sidewall in a position which is inward from the maximum width of the trailer. These vertical posts limit the useful cargo volume inside the trailer because the overall width of trailers is constrained by regulation. Moreover, such post and sheet panel trailers are comparatively heavy. Trailer constructions which fall into this type of category are disclosed in U.S. Pat. Nos. 3,216,758 and 4,042,275.

Some of the disadvantages relating to internal usable volume have been addressed more recently in the second principle type of trailer sidewall construction referred to as "plate" trailers. Plate trailers employ thin aluminum plates or composite materials joined by relatively flat rectilinear strips which secure the plates in a side-by-side relationship. These types of sidewalls have been employed in semi-trailers in order to maximize the width, and cubic capacity, of the cargo carrier. However, while some of these designs succeed in optimizing the internal volume of the cargo carrier, they also necessarily sacrifice columnar strength of the trailer sidewalls.

Moreover, the joining mechanism employed in typical plate-type trailer applications requires a large number of fasteners, such as rivets, to accomplish the joining of the plates which comprise the trailer sidewalls. Inherent in such throughbore fastening systems is the potential for water leakage. Many of these designs are subject to even further water leakage through voids in the seams created by imperfections in plate edges. Indeed, extreme care must be exercised in the handling of these plates in order to insure a clean and smooth seal. Those designs which address leakage by employing flexible seals within joining members nonetheless require a large number of mechanical fasteners. Such a process substantially adds to the production costs associated with the design.

Other special problems noted in plate trailers employing thin, flat sidewalls are a susceptibility to sidewall punctures and inferior columnar strength. As a result of inferior columnar strength, joining members must be spaced more closely together in higher weight and stress-bearing regions of the carrier sidewall. Such a design only creates the need for more seams which are susceptible to leakage and which complicate the production process by, among other things, creating the need for a plurality of plate sizes. Trailers which fall into the above-described category are disclosed in U.S. Pat. Nos. 4,810,027; 5,058,756; 5,066,066; and 5,112,099.

SUMMARY OF THE INVENTION

To overcome these and other problems associated with the existing styles of trailer sidewall constructions, the present invention contemplates an aluminum plate sidewall semi-trailer wherein the plates are of a corrugated design. A joining member allows the plates to be joined in side-by-side relationship. Attachment to this joining member is accomplished through the use of a flexible adhesive—not bolts or rivets. The inherent strength of this corrugated design allows for construction of this trailer without the use of any vertical support posts. Indeed, use of these corrugated sidewall panels offers the strength of a sheet and post trailer as well as the maximized cargo area of even the thinnest plate-type trailer.

The basic components of the present invention include the corrugated panels, seam extrusion members and connection clips. As previously indicated, the corrugated panels do not require any vertical support posts for their installation. Accordingly, the top edges of the corrugated panels may be secured directly to the trailer's upper base rail and the bottom edge of the corrugated panels may be secured to the trailer's lower base rail. The side edges of the corrugated panels are uniquely designed to be inserted into a seam extrusion member. Specifically, multiple connection clips are snapped onto the side edges of a corrugated panel and then the entire assembly is inserted into an elongated groove formed within the seam extrusion member. The purpose of the connection clips is to position the side edges of the corrugated panels within the approximate center of these grooves. As such, the maximum bonding effect will take place once the flexible adhesive is applied to this connection.

The seam extrusion members are positioned between two adjacent corrugated panels and can accommodate the side edges of these panels in their oppositely-positioned grooves. Accordingly, the fully-constructed side wall is comprised of a number of corrugated panels connected by an equal number of seam extrusion members through the use of a flexible adhesive. The only holes which pass through these panels are those which are used to attach the panels to the lower and upper base rails. The remaining surface area of the sidewalls has no other bores whatsoever. In addition, by alleviating the need for any vertical support posts, the interior width of the trailer of the present invention is maximized, within regulatory limitations, to a distance of at least 101 inches.

It is therefore a general object of the present invention to provide an optimal combination of internal usable volume and sidewall strength in a semi-trailer.

In addition, it is an object of the present invention to reduce production costs associated with the trailers through the use of integral, rivetless vertical seams and uniform plate dimensions.

Another object of the present invention is to provide a trailer with sidewall strength superior to either the sheet and post or plate designs but one which has a lighter weight than the sheet and post design.

Moreover, an additional important object of this invention is to provide a high volume trailer that is strong enough to be approved for use in both over-the-road and trailer-on-flatcar service. The enhanced columnar sidewall strength and puncture resistance of this invention are, indeed, essential elements in obtaining approval by container-certifying bodies such as the American Association of Railroads.

Further objects and advantages of the invention will become apparent to those of ordinary skill in the pertinent art upon review of the following detailed description, accompanying drawing, and appended claims.

BRIEF DESCRIPTION OF THE DRAWING

FIG. 1 is a 3-dimensional perspective view of the lightweight trailer of the present invention in its fully-constructed position.

FIG. 2 is a top elevational view of a single corrugated panel.

FIG. 3 is a top elevational view of a single corrugated end panel.

FIG. 4 is a 3-dimensional perspective view of a single corrugated panel.

FIG. 5 is a top elevational view of a single seam extrusion member of the present invention.

FIG. 6 is an end view of a connection clip in accordance with the preferred embodiment of the invention.

FIG. 7 is a side view of the connection clip of FIG. 6.

FIG. 8 is a top, developmental view, with portions removed, of a corrugated panel and connection clip being inserted into a seam extrusion member in accordance with the preferred procedure of the present invention.

FIG. 10 is a perspective view of a fully-assembled sidewall of the present invention exemplifying the assembled positions of the corrugated panels and seam extrusion members between the upper and lower base rails.

FIG. 11 is a block diagram view of the maximum pallet arrangement within a standard sheet and post semi-trailer.

FIG. 12 is a block diagram view of the maximum pallet arrangement within the semi-trailer of the present invention.

Figure 9:
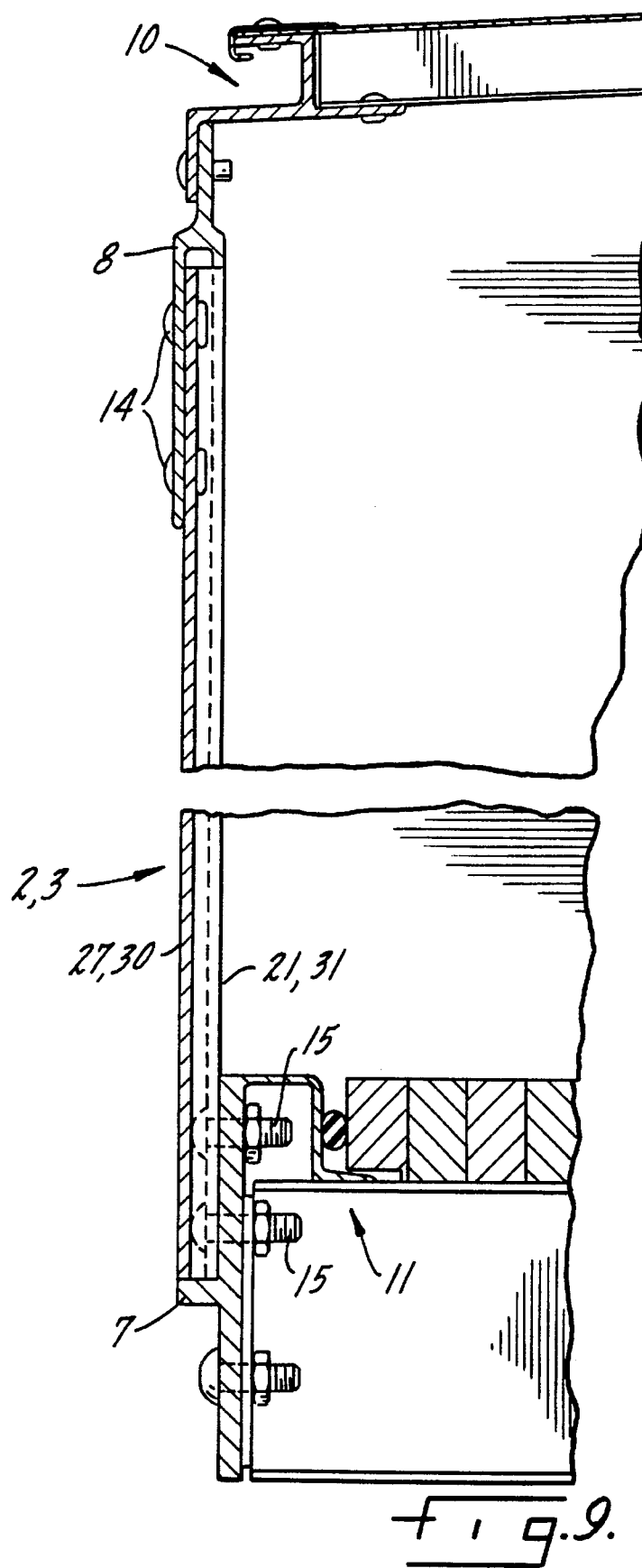
FIG. 9 is a side, cut away view of the corrugated panels mounted between an upper base rail and lower base rail of the semi-trailer frame.

Notice must be taken that the drawings are not necessarily to scale and that the embodiments are sometimes illustrated by phantom lines and diagrammatic representations. In certain instances, details which are not necessary for an understanding of the present invention or which will render other details difficult to perceive may have been omitted. It should be understood, of course, that the invention is not necessarily limited to the particular embodiments illustrated herein.

DETAILED DESCRIPTION OF THE DRAWING

Turning first to FIG. 1, there is shown generally at 1 a 3-dimensional perspective view of the lightweight trailer with integral plate seams in its fully-assembled position. In accordance with the preferred embodiment, the sidewalls of the lightweight trailer 1 are basically constructed of multiple corrugated panels 2 and corrugated end panels 3 mounted between the trailer's lower base rail 7 and upper base rail 8. Such construction gives the lightweight trailer i an outward physical appearance which is not altogether different from either standard post and panel trailers or the various platetype trailers.

Referring now to FIG. 2, a top elevational view of a corrugated panel 2 is illustrated. The subtle corrugated design includes interior corrugation channels 21 and exterior corrugation channels 27; the interior panel surface denoted by 28 and the exterior panel surface denoted by 29. The standard corrugated panel 2 has uniquely designed panel connection edges 22 at each of its two ends. It must be noted that the connection edge axis 26 is parallel to the surfaces of both the interior corrugation channels 21 and the exterior corrugation channels 27 and lies at an approximate midpoint between the two. The purpose of this minor offset will become apparent in the forthcoming discussion on the seam extrusion members 5.

The corrugated panels 2 are formed into a corrugated cross section with alterations on a six-inch center with a twelve-inch total cycle repeat. That is, the individual channels have a channel width 24 of approximately 6 inches. In addition, the outside-to-outside corrugation depth 25 is approximately 0.535 inches in the preferred embodiment.

FIG. 3 presents a top elevational view of a corrugated end panel 3 similar to that which is displayed in FIG. 2. The corrugated end panel 3 has one panel connection edge 32 which is identical to the panel connection edge 22 of FIG. 2, and an end panel outside edge 33. Similarly, the connection edge axis 36 is identical to the connection edge axis 26 of FIG. 2. Associated with outside edge 33 is an outside edge axis 37 which, as illustrated, is in alignment with the surface of the exterior corrugation channels 35. End panel outside edges 33 are not intended to be connected to a seam extrusion member 5 (not shown) or another corrugated panel 2. Rather, the end panel outside edge 33 of the corrugated end panel 3 may be attached to the frame of the trailer in any number of industry standard ways.

The corrugated end panel 3 also has interior corrugation channels 31 and exterior corrugation channels 30, both having a channel width 34 of approximately six inches. Interior panel surfaces are indicated at 38 and exterior panel surfaces are indicated at 39. In addition, the outside-to-outside corrugation depth 35 is also approximately 0.535 inches in the preferred embodiment for the corrugated end panel 3.

Turning now to FIG. 4, what is shown is a three-dimensional perspective view of a standard corrugated panel 2. Such view demonstrates the substantially vertical and parallel position of both the interior corrugation channels 21 and exterior corrugation channels 27. The corrugated panel 2 shown in FIG. 4 has two panel connection edges 22. In addition, such corrugated panel 2 is constructed of heavy gauge metal (aluminum) and has a panel width 20 of approximately 58½ inches and a panel height 23 of approximately 112 inches. The panel profile, thickness, material gauge, and material composition are optimized to achieve the ultimate strength and puncture resistance as well as the highest possible section modulus. These properties provide enhanced columnar stiffness and the most effective use of component weight. These features are also essential for structural compliance with the American Association of Railroad Standards.

FIG. 5 is a top elevational view of the seam extrusion member 5 of the present invention. Seam extrusion member 5 includes an extrusion member channel 51, an exterior surface 52, panel attachment grooves 53, interior projections 54 and exterior projections 55. The extrusion member channel 51 is so designed so as to minimize the overall weight of the seam extrusion member 5. Panel attachment grooves 53 are designed to securely engage the combination of a connection clip 6 and panel connection edge 22. It will be shown that the groove width 56 is approximately equal to the external width 65 (not shown) of a connection clip 6.

Looking now to FIG. 6, an end view of a standard connection clip 6 may be observed. The connection clip 6 has an internal width 64 which is approximately equal to the width of a panel connection edge 22. As such, a panel connection edge 22 may be inserted into the connection clip 6 whereby it is securely engaged by the inwardly projecting prongs 63. The connection clip 6 also has outwardly projecting prongs 61 and 62 which serve to positively secure the connection clip 6 within a panel attachment groove 53 of a seam extrusion member 5.

FIG. 7 is a side view of the connection clip 6 shown in FIG. 6. In addition to the outwardly projecting prongs 61 and 62 and inwardly projecting prongs 63, a length 66 of the connection clip 6 is shown which is approximately 0.5 inches. It is intended that multiple connection clips 6 be attached to a single panel connection edge 22 before insertion into a panel attachment groove 53 of a seam extrusion member 5. The connection clips 6 provide mechanical maintenance of the corrugated panel 2 and seam extrusion member 5 during the pre-cure stage of the adhesive which is used for seaming. The connection clips 6 further center the opposed surfaces of a panel connection edge 22 so that each surface receives an equal thickness of a moisture cured polyurethane adhesive.

Referring now to FIG. 8, a developmental view of the attachment process between a corrugated panel 2 and seam extrusion member 5 is shown. Once a connection clip 6 is snapped onto a panel connection edge 22 of a corrugated panel 2, it is prepared to be inserted into a panel attachment groove 53 of the seam extrusion member 5. When the panel connection edge 22 is fully inserted into the panel attachment groove 53, it can be seen that the interior projections 54 are substantially parallel and horizontally aligned with the interior corrugation channels 21, and that the exterior projections 55 are substantially parallel and horizontally aligned with the exterior corrugation channels 27. Such a design allows for a very clean and secure connection between the corrugated panels 2 and seam extrusion member 5 while not taking away any cargo space from the interior of the semi-trailer.

FIG. 9 is an end, cutaway view of both corrugated panels 2 and corrugated end panels 3 mounted between the semi-trailer's lower base rail 7 and upper base rail 8. As is typical in the industry, the lower base rail 7 is affixed to the trailer's floor assembly 11. Similarly, the upper base rail 8 is secured to the trailer's roof assembly 10. FIG. 9 demonstrates how the exterior corrugation channels 27 and 30 may be secured to the upper base rail 8 using a standard rivet installation method 14. The interior corrugation channels 21 and 31 are shown secured to the lower base rail 7 using a standard bolt installation method 15. It is within the contemplation of the present invention that the corrugated panels 2 and corrugated end panels 3 be attached to the lower base rail 7 and upper base rail 8 in any number of ways. FIG. 9 merely offers an example of how the panels might be affixed using both the rivet installation method 14 and bolt installation method 15.

Looking now to FIG. 10, a side view of a fully assembled sidewall of the lightweight trailer 1 is illustrated. This figure demonstrates the approximate positions of the seam extrusion members 5 with respect to the corrugated panels 2 and corrugated end panels 3. As indicated, the seam extrusion members 5 have a vertical height which is approximately equal to that of the corrugated panels 2. The corrugated panels 2, corrugated end panels 3 and seam extrusion members 5 are all installed underneath the upper base rail 8 and over the lower base rail 7. Such arrangement is intended to limit any potential leakage in and around bolt or rivet areas.

FIGS. 11 and 12 are provided to demonstrate the difference in usable cargo area between a standard post and panel type trailer and the trailer of the present invention. FIG. 11 is a box diagram illustration of the number of pallets 19 which may be arranged within a standard post and plate trailer. Given that a conventional sheet and post trailer has an interior width 17 of approximately 98.5 inches, only twenty-two pallets 19 may be loaded. Conversely, FIG. 12 is a block diagram illustration of the number of pallets 19 which may be arranged in the semi-trailer of the present invention. Given that the interior width 18 of the semi-trailer of the present invention is approximately 101 inches, twenty-five pallets 19 may be loaded into this trailer. The additional 2½ inches in the semi-trailer of the preferred embodiment allow one entire row of pallets 19 to be installed width-wise rather than length-wise, using a standard 44-inch by 56-inch pallet.

It should be understood that the above-described embodiment is intended to illustrate, rather than limit, the invention and that numerous modifications could be made thereto without departing from the scope of the invention as defined by the appended claims. Clearly, the corrugated panels 2 could be of a variety of corrugated designs and still be within the contemplation of the present invention. Indeed, any number of minor physical modifications could be made to the corrugated panels 2, corrugated end panels 3, seam extrusion members 5 and connection clips 6 while still retaining their ability to be interconnectively held together.

While the present invention has been illustrated in some detail according to the preferred embodiment shown in the foregoing drawing and description, it will become apparent to those skilled in the pertinent art that variations and equivalents may be made within the spirit and scope of that which has been expressly disclosed. Accordingly, it is intended that the scope of the invention be limited solely by the scope of the hereafter appended claims and not by any specific wording in the foregoing description.

We claim:

1. In a cargo-carrying trailer having a floor supported by a lower rail assembly, a roof supported by an upper rail assembly, a front wall secured between said lower rail assembly and said upper rail assembly, and a plurality of panels making up the side walls of the trailer, the improvement comprising:

(a) a plurality of rectangular and substantially planar vertical panels being mounted between said lower rail assembly and said upper rail assembly, said panels being of corrugated construction so as to include a plurality of individual channels of corrugation, said individual channels being vertically extending and horizontally aligned, said panels including side edges wherein said panels may be positioned upon said trailer with said side edges of adjacent panels being in near-abutting relation to each other, said side edges extending no further inward into said trailer body than an innermost interior surface of said panel;

(b) a plurality of attaching members being positioned between said side edges of adjacent panels, each of said attaching members having a vertical length approximately equal to a vertical height of said panels and including two outwardly extending channels to accommodate said side edges, said attaching members being mounted between said lower rail assembly and said upper rail assembly and extending no further inward into said trailer body than an innermost interior surface of said adjacent panels;

(c) means for securely attaching said side edges of said panels within said channels of said attaching members without the use of screws, bolts or rivets.

2. The cargo-carrying trailer of claim 1, wherein said panels are manufactured of aluminum.

3. A trailer body having a floor, a roof, a lower base rail, an upper base rail, a front wall and two side walls, said side walls comprising a plurality of substantially rectangular vertical panels having side edges, said side edges of adjacent panels being positioned in close parallel proximity to each other, said panels being mounted between said upper base rail and said lower base rail and being of corrugated construction so as to include a plurality of individual channels of corrugation, said individual channels being vertically extending and horizontally aligned, said side walls further comprising joining members positioned between adjacent panels, said side edges of adjacent panels being secured to a joining member without any screws, bolts or rivets, said joining member having a vertical height substantially equal to a vertical height of said panels and including two narrow channel sections to accommodate said side edges of adjacent panels, said side edges of adjacent panels being securely fastened within said channel sections with a flexible adhesive.

4. The trailer body of claim 3, further comprising multiple gauging clips, said gauging clips being snapped over said side edges of adjacent panels and wedgedly inserted into said channel sections such that said side edges are maintained in relatively central positions within said channel sections for adhesive application purposes.

5. An improved side wall panel for use with either road trailers or flat-car trailers, said panel being mounted between upper and lower side rails associated with a roof and floor, respectively, said panel having a substantially corrugated shape so as to include a plurality of individual channels of corrugation, said individual channels being vertically extending and horizontally aligned, said panel being substantially planar and having two side edges, multiples of said panels able to be connected at said side edges without any screws, bolts or rivets, said side walls further comprising joining members positioned between adjacent panels, said side edges of adjacent panels being attached to a joining member, said side edges of adjacent panels attached to a joining member with a flexible adhesive.

6. The improved side wall panel of claim 5, wherein said joining member has two channel sections to accommodate said side edges of said adjacent panels.

7. The improved side wall panel of claim 6, wherein multiple gauging clips are attached to said side edges of adjacent panels, said gauging clips positioning said side edges within an approximate center of said channel sections for adhesive application purposes.

8. In a cargo-carrying trailer having a floor supported by a lower rail assembly, a roof supported by an upper rail assembly, a front wall secured between said lower rail assembly and said upper rail assembly, and a plurality of panels making up the side walls of the trailer, the improvement comprising:

(a) a plurality of rectangular and substantially planar vertical panels being mounted between said lower rail assembly and said upper rail assembly, said panels being of corrugated construction so as to include a plurality of individual channels of corrugation, said individual channels being vertically extending and horizontally aligned, said panels including side edges wherein said panels may be positioned upon said trailer with said side edges of adjacent panels being in near-abutting relation to each other;

(b) a plurality of attaching members being positioned between said side edges of adjacent panels, each of said attaching members having a vertical length approximately equal to a vertical height of said panels and including two outwardly extending narrow channels to accommodate said side edges, said attaching members being mounted between said lower rail assembly and said upper rail assembly; and (c) a flexible adhesive for securely attaching said side edges of said panels within said narrow channels of said attaching members.

9. The cargo-carrying trailer of claim 8, further comprising multiple gauging clips being affixed to said side edges of said panels, said gauging clips positioning said side edges in an approximate center of said narrow channels for adhesive application purposes.

10. An improvement in a wall structure for a cargo-carrying trailer, the improvement comprising:

(a) a plurality of side wall panels of corrugated construction, said side wall panels being vertically extending and horizontally aligned, each of said panels including side edges which extend no further inward into said trailer body than an innermost interior surface of said panel; and (b) an attaching member positioned between opposing side edges of adjacent panels, each attaching member having an outwardly open channel on each front and rear edge thereof which receives the opposing side edges of adjacent panels, said attaching member extending no further inward into said trailer body than an innermost interior surface of said adjacent panels.

11. The improved wall structure of claim 10, further including means for securely attaching the side edges of adjacent panels within said channels of said attaching members without the use of screws, bolts or rivets.

* * * * *